Sept. 16, 1969  F. T. NIELSSON  3,467,495
PREPARATION OF CALCIUM PHOSPHATES
Filed Dec. 23, 1965
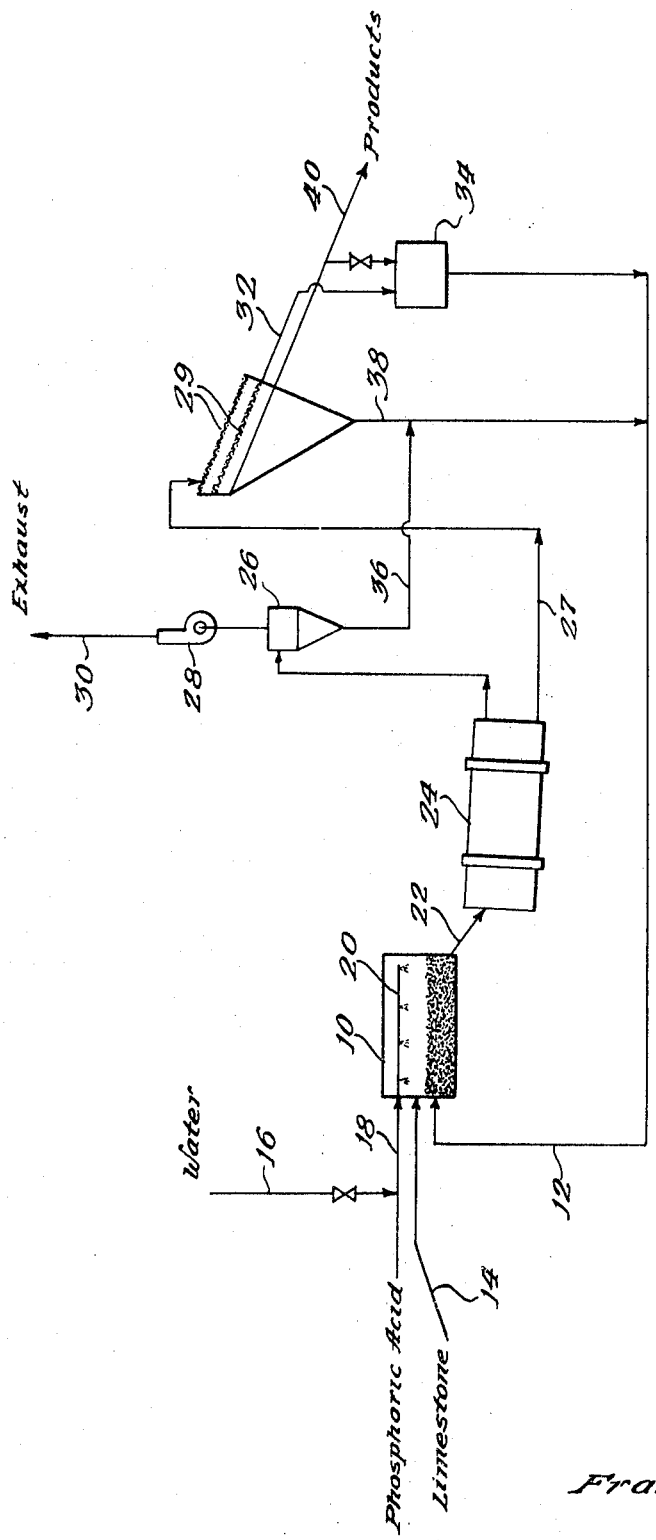
Inventor
Francis T. Nielsson United States Patent Office 3,467,495
Patented Sept. 16, 1969

3,467,495
PREPARATION OF CALCIUM PHOSPHATES
Francis T. Nielsson, Morton Grove, Ill., assignor to International Minerals and Chemical Corporation, a corporation of New York
Filed Dec. 23, 1965, Ser. No. 515,951
Int. Cl. C01b 25/32; B01j 2/00
U.S. Cl. 23—108                                    12 Claims

ABSTRACT OF THE DISCLOSURE

A granular calcium phosphate product, which may be monocalcium phosphate, dicalcium phosphate or mixtures thereof, is produced by reacting at a temperature of about 130° to 200° F. a 28–80% $H_3PO_4$ phosphoric acid with ground limestone or lime in proportions to provide a mole ratio of CaO to $P_2O_5$ of about 0.9:1 to 2:1. The reaction is conducted while mixing the phosphoric acid and limestone or lime with sufficient particulate monocalcium phosphate, dicalcium phosphate or mixtures thereof to provide nuclei for granulation of the product of the reaction and yield a granular product. External heat is applied to the granular product to substantially dry the same.

---

This invention relates to phosphatic materials and, more particularly, it relates to the preparation of granular calcium phosphates. The calcium phosphates produced in accordance with this invention are especially useful as animal feed supplement materials.

Phosphatic materials have heretofore been used as animal feed supplements in order to promote the healthy growth of livestock and poultry. This is due to the fact that a minimum content of available calcium and phosphorus is required in animal diets for adequate nutrition, and it has been found to be necessary to add mineral supplements, particularly calcium orthophosphates, to foodstuffs so that these essential nutrients are present in at least minimal amounts.

Numerous processes are known wherein animal feed supplement material, i.e., dicalcium phosphate, is manufactured by reaction of phosphoric acid prepared by the electric furnace method with calcium oxide. Feed grade calcium phosphates have also been prepared by precipitation from defluorinated phosphate solutions produced by the reaction of phosphate rock and a mineral acid, such as sulfuric acid. Reaction of these "wet process" phosphate solutions with lime or limestone produces in many instances a product predominated by small particles or crystals, which present a recovery problem. Further, the recovered material is transformed on drying into powdery solids which present handling difficulties. In general, the prior art processes of producing calcium phosphates are not entirely satisfactory since they present operational difficulties and/or they are often limited as to the calcium phosphate product produced.

It has now been discovered that a high quality calcium phosphate feed ingredient can be produced without encountering the operational shortcomings and disadvantages of the processes heretofore in use. The process of this invention can be used to prepare monocalcium phosphate, dicalcium phosphate, or mixtures thereof in varying proportions.

The adaptability of the process of this invention to produce the different calcium phosphate products is advantageous in that it gives feed formulators flexibility in formulating animal feeds to meet specific requirements. For example, a feed ingredient having a relatively high phosphorus to calcium ratio, i.e., substantially pure monocalcium phosphate, can be used to meet the requirements of livestock and poultry having a diet which is high in calcium as compared to phosphorus. On the other hand, the process of this invention can be used to produce a substantially pure dicalcium phosphate supplement for use in the feed of livestock or poultry having a diet which is equally deficient in calcium and phosphorus.

It is, therefore, the primary object of this invention to provide a process which can be used to produce substantially pure monocalcium or dicalcium phosphate, or mixtures thereof.

Another object of this invention is to provide a process for the production of a calcium phosphate product which overcomes the disadvantages of processes hereinbefore in use.

Another object of this invention is to provide a process utilizing phosphoric acid and limestone or lime to produce an animal feed supplement.

Still another object of this invention is to provide a process for the production of an animal feed supplement having a relatively high phosphorus to calcium ratio.

These and further objects of this invention will become apparent or be described as the description thereof herein proceeds and reference is made to the accompanying drawing which diagrammatically illustrates a process utilizing the principles of this invention.

In accordance with this invention, granular calcium phosphates which are useful as animal feed supplement materials are produced by establishing in a suitable apparatus a bed of calcium phosphate particles of a sufficient fineness to furnish proper nuclei for granulation. Phosphoric acid and water are introduced into the bed along with a granular calcium compound reactive with phosphoric acid, e.g., limestone, and the mixture is intimately mixed and reacted at an elevated temperature to form the desired granular calcium phosphate product, which is then removed and dried.

The process of this invention is not limited to the use of any particular piece of equipment or apparatus. However, thorough mixing is a necessity to bring the materials into intimate contact with one another for reaction.

It has been found, as for example, that a rotating drum or reactor-granulator of the type conventionally used for preparing a granular complete fertilizer can be advantageously employed for such a mixing operation. When such an apparatus is used in a continuous process, the raw materials are continuously fed into one end thereof and the calcium phosphate product is continuously removed from the other end. It is to be understood, however, that other types of equipment, such as a pug mill, are also useful.

The bed which is established in the reaction apparatus will be of a sufficient thickness and comprise calcium phosphate particles ground to an appropriate fineness to furnish sufficient carrier and supply surface for the phosphoric acid so as to furnish the appropriate nuclei for granulation. As a general practice, the bed, in a rotary drum as for example, will have a maximum depth of about four to twelve inches, although other thicknesses may be used. It will be evident that the diameter of the drum will influence the depth to a certain extent. The size of the calcium phosphate particles will obviously be less than the minimum size desired in the finished product with a minimum of fines and coarses. To illustrate, at least approximately 90% of the particles will have a size within the range of about 8 to 30 mesh (Tyler standard) when it is desired to produce a product having a size in the range of $-12 +28$ mesh for the animal feed industry. Although there is no criticality as to the type of calcium phosphate utilized for the bed, so that it might be mono-calcium phosphate, dicalcium phosphate, or a mixture thereof in any desired proportion, the bed preferably will be substantially of the same material as the product to be produced, for obvious reasons. In a continuous process the material constituting the bed will most advantageously be recycled fines and crushed oversize material. For satisfactory results, the amount of the calcium phosphate utilized as the bed, that is, the recycled material in a continuous process, is a major portion of the product, and usually is within the range of about 2.5 to 10 times the amount of the calcium phosphate withdrawn as product. However, other recycle rates may also be used.

The phosphoric acid and water are added to the bed to provide an initial acid concentration of about 28% to 80% $H_3PO_4$ (about 20% to 58% $P_2O_5$) by weight based on the total acid and water introduced. An acid which is too concentrated will result in lack of reaction between the acid and the calcium compound, whereas an acid which is too dilute will result in a bed which is too fluid to be handled in the subsequent drying step. It will be evident that the phosphoric acid and water will be most conveniently added to the reaction vessel as an aqueous phosphoric acid solution, but, if desired, the acid and water may be added separately. If the calcium phosphate product to be produced is to be used to an animal feed supplement, it is desirable that the phosphoric acid contain less than about one-hundredth part by weight of fluorine per part of elemental phosphorus since a fluorine content in excess of this amount might have a toxic effect when a fed to livestock and poultry. Phosphoric acid produced by the well-known "furnace method" which has been adjusted to the above-mentioned concentration range can be used. "Wet process" phosphoric acid is also useful provided that the necessary steps have been taken to reduce its fluorine content to below the above-mentioned toxic level, and provided that the $H_3PO_4$ concentration is adjusted to the above-mentioned concentration range. A mixture of the proper concentration of "wet process" and "furnace" phosphoric acid can also be used. The phosphoric acid is preferably sprayed over the mass of particles constituting the bed, but other means of introducing the acid into the reaction vessel, e.g., the reactor-granulator, are possible, as by introducing the acid under pressure directly into the bed.

The calcium compound which is reacted with the phosphoric acid in accordance with this invention, e.g., limestone, is added in an amount sufficient to provide a mole ratio of CaO (supplied by the calcium compound) to $P_2O_5$ (supplied by the acid) of between about 0.9 and about 2 to 1. A product containing excessive quantities of unreacted limestone is produced if too small an amount of acid is employed, whereas too much acid will result in a product containing an undesirable amount of free acid. Examples of calcium compounds which are useful in the process of this invention are calcium carbonate (limestone) and lime. Limestone is more advantageously utilized than lime since an excessive quantity of extremely fine materials is sometimes produced when lime is used. More specifically, it is preferred that a limestone having a minimum calcium content of about 38% (i.e., 95% $CaCO_3$) be used since the purity of the product would suffer if a limestone with a lower calcium content were utilized. The calcium compound feed material, e.g., limestone, will substantially range in size from about −90 mesh (Tyler standard) down to about −325 mesh. Normally, at least 75%, and sometimes at least 90%, will be −200 mesh. It will be evident that the recycle and limestone or lime may be added separately to the reaction vessel or that they may be mixed before being added to the reaction vessel.

The temperature of the reaction mixture can be satisfactorily controlled at atmospheric pressure, and therefore it is preferred to carry out reaction under substantially atmospheric pressure. In other words, there is no particular advantage in using either a super-atmospheric or sub-atmospheric pressure, although such pressure conditions are not excluded from the broad scope of this invention. When operating at atmospheric pressure, sufficient heat should be applied to the reaction mixture to provide a reaction temperature of about 130° to 200° F. This minimum reaction temperature of about 130° F. will produce a product having a maximum free-moisture content of about 12% and a minimum of free water on the surface thereof which would present handling difficulties. Preferably, the product discharged from the reaction apparatus, e.g., the reactor-granulator, will contain about 6 to 10% free moisture. The product is then introduced into a dryer, which generally operates at a temperature within the range of about 600° to about 1100° F. to produce a substantially dry final product, i.e., a product having a maximum moisture content of about 2.5%.

The aforementioned reaction temperature is maintained in the reaction apparatus by either recycling hot material which is obtained from the dryer, introducing a hot acid and/or calcium compound which is reacted with the acid, applying external heat to the reaction vessel, or a combination of these methods. Part of the required heat is furnished by heat of reaction. Inasmuch as the recycle rate in the process of this invention is relatively high and the product is heated in the drying operation, the desired reaction temperature can be maintained solely by taking advantage of hot recycle.

The temperature of the calcium phosphate product should be kept below about 270° F. in the reactor and dryer if the product is to be used as a feed supplement material, since higher temperatures will result in pyro- and meta-phosphoric acids being formed and calcium salts of these acids are not suitable feed ingredients.

As hereinbefore pointed out, a rotating drum or reactor-granulator of the type used for preparing complete fertilizers is useful as the reaction vessel. When such an apparatus is used, it is preferred that the phosphoric acid, water and calcium compound reactive with phosphoric acid be added in amounts to provide an initial acid concentration of about 40% to 70% $H_3PO_4$ (about 29% to 50% $P_2O_5$) and a mole ratio of CaO to $P_2O_5$ of between about 1.1 and about 1.9 to 1. An acid concentration of about 58% to 65% $H_3PO_4$ (about 42% to 47% $P_2O_5$) is still more preferred. The preferred reaction temperature with a rotating drum or reactor-granulator is about 150° to 190° F. It has been found that the desired reaction temperature can be maintained in the reactor-granulator solely by utilizing recycle at a temperature within the range of about 200° to 300° F. when a recycle rate between about 2.5 and 10 to 1 is used. Preferably, a recycle at a temperature of about 210° to 270° F. is used at a recycle rate of between about 5 and 8 to 1.

The residence time of the reactants in the reactor-granulator or other apparatus will vary depending upon the temperature maintained in the reactor-granulator, the type of product desired, the concentration of the phosphoric acid, and other factors. However, it will rarely be necessary to employ a residence time of over 10 minutes in the reactor-granulator, although a residence time of at least two minutes will usually be required. Good results are obtained with a residence time of about 3 to 5 minutes when employing a reactor-granulator under the conditions hereinbefore described.

The aforementioned conditions are controlled so that the reaction proceeds to the degree necessary to produce the desired product; that is to say, so that the reaction proceeds to produce either monocalcium phosphate, dicalcium phosphate, or a mixture thereof in the desired proportion. As for example, if a product having a relatively high phosphorus to calcium ratio, i.e., substantially pure monocalcium phosphate, is desired, a low $$CaO:P_2O_5$$

mole ratio, high reaction temperature and a high acid concentration are utilized. More specifically, a product predominating in monocalcium phosphate is obtained by the addition of acid and limestone in amounts to provide a $CaO:P_2O_5$ mole ratio of about 1.1:1 to 1.4:1, and utilizing a phosphoric acid with a concentration of about 60% to 65% $H_3PO_4$ and a recycle temperature of about 240° to 270° F. In contradistinction, the production of a substantially pure dicalcium phosphate product necessitates the utilization of a CaO to $P_2O_5$ mole ratio of about 1.7:1 to 1.9:1, a phosphoric acid concentration of about 58% to 63% $H_3PO_4$, and a recycle temperature of about 210° to 240° F. Products consisting of a mixture of monocalcium phosphate and dicalcium phosphate are obtained by utilizing an acid concentration and/or acidulation ratio and/or recycle temperature intermediate the above limits, with the specific conditions used being dependent upon the desired product.

When the process of this invention is operated on a continuous basis, the start-up procedure consists of establishing the calcium phosphate bed in the reactor-granulator as hereinbefore described and adding to the bed a calcium compound which is reactive with phosphoric acid, such as limestone, in an amount corresponding to about 20% by weight of the bed and the requisite amount, based on the quantity of the limestone, of the phosphoric acid. The operation of the equipment is then initiated and all of the product obtained from the dryer is recycled to the reactor-granulator. This procedure is continued until the temperature of the recycled material reaches the desired range to produce the desired product, and then a continuous supply of the limestone and phosphoric acid to the reactor-granulator is initiated and product is withdrawn from the system.

A pug mill is an example of an apparatus other than a reactor-granulator which is useful as the reaction vessel in carrying out the process of this invention. When a pug mill is used, phosphoric acid having a concentration of about 51% to 58% $H_3PO_4$ (about 37% to 42.5% $P_2O_5$) is preferred. The amount of calcium compound reactive with phosphoric acid, e.g., limestone, and the phosphoric acid are adjusted so as to provide a preferred CaO to $P_2O_5$ mole ratio of between about 0.9 and about 1.5 to 1, with a mole ratio of between about 1.0 and about 1.3 to 1 being still more preferred.

The reaction temperature of the mixture in the pug mill at atmospheric pressure is preferably within the range of about 130° to 176° F., and a reaction temperature within the range of about 160° to 170° F. is still more preferred. This reaction temperature can be satisfactorily maintained, as for example, by introducing into the pug mill the phosphoric acid at a temperature of about 30° to 270° F., preferably at about 180° to 225° F., and the recycle at a temperature of about 90° to 250° F., preferably at about 120° to 140° F., using a recycle rate of about 2.5:1 to 4.0:1.

The residence time of the mixture in the pug mill will again vary depending upon various factors. An example of a suitable residence time for a pug mill being operated at about 120 r.p.m. is about 30 to 40 seconds, although shorter or longer residence times are also useful. As hereinbefore illustrated with respect to the use of a reactor-granulator, the conditions in the pug mill, e.g., acid concentration, CaO to $P_2O_5$ mole ratio, etc., are controlled so that the reaction proceeds to the degree necessary to produce the desired product.

Reference is now made to the accompanying drawing which diagrammatically shows one suitable setup of a plant utilizing the process of this invention. In referring to the drawing, the reference numeral 10 designates a rotating reactor-granulator or drum which is adapted to maintain therein a bed of rolling particles. Reactor-granulator 10 includes at one end, i.e., the inlet end, provision for continuously introducing calcium phosphate particles for establishing a bed, a calcium compound which is reactive with phosphoric acid to produce a calcium phosphate product, such as limestone, and phosphoric acid. The outlet end of drum 10 includes provision for continuously removing the product.

The calcium phosphate material utilized for establishing the bed, e.g., monocalcium phosphate, is introduced into reactor-granulator 10 through line 12. In the continuous process which is shown in the drawing, the monocalcium phosphate is a hot recycle obtained from later drying and sizing steps in the process as to be hereinafter described.

Limestone rock ground to 85% −200 mesh is introduced into the inlet end of reactor-granulator 10 by way of line 14. Phosphoric acid which has been diluted to a concentration of 56% $H_3PO_4$ is supplied by line 18 to distribution or spray system 20 from which it is sprayed on top of the bed. Water in line 16 may be added to the phosphoric acid in line 18 to dilute it to the desired concentration. The amounts of the phosphoric acid, limestone and recycled material introduced into reactor-granulator 10 are controlled such that the amount of the recycled material is about 5 to 8 times that of the product produced, and a CaO to $P_2O_5$ mole ratio of about 1.3:1 is established in reactor-granulator 10.

The rotation of reactor-granulator 10 causes the thorough mixing and reacting of the phosphoric acid and limestone. Neutralization occurs in the films of acid on the surface of the recycled material to produce monocalcium phosphate. Granulated monocalcium phosphate at a temperature of about 180° F. and having a moisture content of about 8% is discharged from drum 10 through line 22, and is introduced into rotating drum 24. Drum 24 serves as a dryer and has air at a temperature of about 800° F. passed therethrough. The drum is equipped with lifting flights which drop the granules in contact with the warm air until they are dried, that is, until they have a maximum moisture content of about 2%. The hot air is withdrawn from dryer 24, is circulated by means of blower 28 through cyclone 26 to remove fines therefrom, and is then exhausted through line 30.

Dried granules are withdrawn from dryer 24 at a temperature of 240° F. and are passed by any suitable means for conveyance, illustrated by line 27, to sizing equipment such as a set of screens 29. Material is separated by screens 29 into a product-size fraction, an oversize fraction, and fines. The oversize material is retained on the surface of the top screen; and the product material and fines pass through the top screen to the surface of the bottom screen, which collects the product material and through which pass the fines. The oversize fraction is taken off of the top one of screens 29 via line 32 and is passed into grinding mill 34. The fines which have been removed from the dryer exhaust by cyclone 26 are passed through line 36 to line 38 where they are combined with the fines from screens 29. The combined fines are combined with the discharge from mill 34 and the combined fractions are recycled through line 12 into reactor-granulator 10. If necessary, some of the product size material may also be crushed and added to the recycled fines. The product-size material is withdrawn from screens 29 by line 40 and is sent directly to storage without being cooled.

This invention will be more fully understood from a study of the following examples which are given for the purpose of illustrating the process of this invention.

EXAMPLE I

A plant was constructed substantially as shown in the attached drawing. Recycled monocalcium phosphate particles sized or ground to −28 mesh were continuously introduced into the inlet end of a rotating reactor-granulator to provide a bed for granulation. Phosphoric acid of 75% $H_3PO_4$, which was produced by the electric furnace process, was diluted by the addition of water at a rate of 1 part of water per 5 parts of acid, to obtain an acid of 62.5% $H_3PO_4$, and this diluted acid and limestone were continuously introduced into the reactor-granulator in amounts sufficient to provide a CaO:$P_2O_5$ mole ratio of about 1.2 to 1. The limestone was ground to a particle size such that 85% passed through a 200 mesh screen. The reactor-granulator was rotated to intimately mix the feed ingredients to bring the materials into intimate contact with one another for reaction and to provide a residence time of about 3 minutes. A monocalcium phosphate product having a moisture content of about 8% was continuously discharged from the reactor-granulator at a temperature of about 180° F.

The material discharged from the reactor-granulator was introduced into a rotary kiln dryer wherein a temperature of about 800° F. was maintained to complete granulation and dry the product to less than 1.8% moisture. The product was removed from the dryer and screened to separate +14 mesh material as oversize and −28 mesh material as fines. The oversize material was crushed, mixed with the fines and some crushed unsize product when necessary, and the combined fractions were recycled at a temperature of about 260° F. to the reactor-granulator. The product delivered to storage was analyzed as containing 23.13% P and 17.87% Ca.

EXAMPLE II

Using the same apparatus and procedure employed in Example I, a further run was made, except that the conditions were controlled to produce a product consisting of substantially pure dicalcium phosphate. The same limestone feed material was used as in Example I and it was continuously introduced into the reactor-granulator with phosphoric acid in amounts to provide a CaO to $P_2O_5$ mole ratio of about 1.71 to 1. The phosphoric acid used in this run was a so-called "wet process" acid which was defluorinated to contain less than about one-hundredth part by weight of fluorine per part of elemental phosphorus. The acid had an initial concentration of 75% but it was premixed with water at a rate of 1 part of water per 4 parts of acid to obtain a 60% $H_3PO_4$ acid. The recycled material was introduced into the inlet end of the reactor-granulator at about 220° F. to yield a bed temperature of 150° F. The remainder of the procedure described in Example I remained the same and on analysis, the product was found to contain 18.6% P and 23.2% Ca.

EXAMPLE III

A further run was made using the equipment and procedure of Example I to produce a product consisting of a mixture of monocalcium phosphate and dicalcium phosphate. In this run, the phosphoric acid defined in Example II was introduced with a limestone feed which was the same as that utilized in Example I to provide a CaO to $P_2O_5$ mole ratio of about 1.63 to 1. The phosphoric acid and limestone were introduced into the reactor-granulator along with the recycled material at a temperature of about 230° F. The product obtained from the final screening operation had a P content of about 18.5% and a Ca content of about 20.2%.

EXAMPLE IV

Product from a later step in the process, having a size of 90% −20 mesh and a temperature of about 130° F., and limestone ground to 90% −200 mesh are continuously introduced into the inlet end of a rotating pug mill. A 78.7% $H_3PO_4$ "wet process" phosphoric acid, defluorinated to contain less than one-hundredth part by weight of fluorine per part of elemental phosphorus, is diluted with sufficient water to obtain a concentration of 55% $H_3PO_4$. The diluted acid is heated to about 210° F. and is also continuously introduced into the inlet end of the pug mill. The limestone, recycle produce and acid are introduced into the pug mill in amounts such that the product recycle rate is about 3:1 and the mole ratio of CaO to $P_2O_5$ is about 1.1:1. A product having a moisture content of about 12% and a temperature of about 165° F. is continuously withdrawn from the pug mill. The material which is withdrawn from the pug mill is dried, sized and recycled substantially as described in Example I, except that recycle product is introduced into the pug mill at 130° F., as hereinbefore described.

Although this invention has been described with respect to specific embodiments it will be apparent that obvious modifications may be made by one skilled in the art without departing from the intended scope of this invention. As for example, while the process of this invention has been described as a continuous process it will be apparent that it is also operable as a batch process.

The embodiments of the invention in which an exclusive property or privilege is claimed are defined as follows:

1. The process for the production of a granular calcium phosphate of the group consisting of monocalcium phosphate, dicalcium phosphate and mixtures thereof, which comprises
    (a) continuously introducing phosphoric acid having a concentration of about 28 to 80% $H_3PO_4$, granular lime or limestone, and fines recycled from a later-mentioned step into a reaction vessel wherein a reaction temperature of about 130° to 200° F. is maintained,
    (b) said phosphoric acid and limestone or lime being introduced in amounts to provide a mole ratio of CaO in said limestone or lime to $P_2O_5$ in said phosphoric acid of about 0.9:1 to 2:1.
    (c) agitating the contents of said reaction vessel so that said phosphoric acid reacts with said limestone or lime, and said recycled fines provide nuclei for granulation of the reaction product of said phosphoric acid and limestone or lime to form a granular calcium phosphate,
    (d) continuously withdrawing said granular calcium phosphate from said reaction vessel,
    (e) drying said withdrawn granular calcium phosphate,
    (f) sizing said dried granular calcium phosphate to separate the undersize material and oversize material from product-size material,
    (g) crushing said oversize material and a sufficient quantity of product-size material so that the total amount of said undersize material and crushed material is about 2.5 to 10 times the amount of the remaining portion of said dried granular calcium phosphate, and
    (h) recycling said undersize material and crushed material as fines to said reaction vessel.

2. The process in accordance with claim 1 wherein said phosphoric acid is reacted with limestone of a size that passes through a screen of a size within the range of about 325 to 90 mesh.

3. The process in accordance with claim 2 wherein phosphoric acid having a concentration of about 40 to 70% $H_3PO_4$, limestone and recycled fines are continuously introduced into a reactor-granulator wherein a reaction temperature of about 150° to 190° F. is maintained, said phosphoric acid and limestone are introduced in amounts to provide a mole ratio of CaO in said limestone to $P_2O_5$ in said phosphoric acid of about 1.1:1 to 1.9:1, and said withdrawn granular calcium phosphate has a maximum moisture content of 12%.

4. The process in accordance with claim 3 wherein said phosphoric acid has a concentration of about 58 to 65% $H_3PO_4$, and said recycled fines are at a temperature of about 200° to 300° F. when introduced into said reactor-granulator.

5. The process in accordance with claim 4 wherein said recycled fines are at a temperature of about 210° to 270° F. when introduced into said reactor-granulator, and the total amount of said undersize material and crushed material is about 5 to 8 times the amount of the remaining portion of said dried granular calcium phosphate.

6. The process in accordance with claim 5 wherein at least 75% of said limestone is of a size that passes through a 200 mesh screen.

7. The process in accordance with claim 6 wherein said phosphoric acid has a concentration of about 60 to 65% $H_3PO_4$, said limestone and phosphoric acid are introduced into said reactor-granulator in amounts to provide a mole ratio of CaO in said limestone to $P_2O_5$ in said phosphoric acid of about 1.1:1 to 1.4:1, and said recycled fines are at a temperature of about 240° to about 270° F. when introduced into said reactor-granulator.

8. The process in accordance with claim 6 wherein said phosphoric acid has a concentration of about 58 to 63% $H_3PO_4$, said limestone and phosphoric acid are introduced into said reactor-granulator in amounts to provide a mole ratio of CaO in said limestone to $P_2O_5$ in said phosphoric acid of about 1.7:1 to 1.9:1, and said recycled fines are at a temperature of about 210° to 240° F. when introduced into said reactor-granulator.

9. The process in accordance with claim 2 wherein phosphoric acid having a concentration of about 51 to 58% $H_3PO_4$, limestone and recycled fines are continuously introduced into a pug mill wherein a reaction temperature of about 130° to 176° F. is maintained, and said phosphoric acid and limestone are introduced in amounts to provide a mole ratio of CaO in said limestone to $P_2O_5$ in said phosphoric acid of about 0.9:1 to 1.5:1.

10. The process in accordance with claim 9 wherein said phosphoric acid is at a temperature of about 30° to 270° F. and said recycled fines are at a temperature of about 90° to 250° F. when introduced into said pug mill, said phosphoric acid and limestone are introduced in amounts to provide a mole ratio of CaO in said limestone to $P_2O_5$ in said phosphoric acid of about 1.0:1 to 1.3:1, and said withdrawn granular calcium phosphate has a maximum moisture content of about 12%.

11. The process in accordance with claim 10 wherein at least 75% of said limestone is of a size that passes through a 200 mesh screen.

12. The process in accordance with claim 11 wherein said phosphoric acid at a temperature of about 180° to 225° F. and said recycled fines at a temperature of about 120° to 140° F. are introduced into said pug mill to maintain a reaction temperature of about 160° to 170° F., and the total amount of said undersize material and crushed material is about 2.5 to 4 times the amount of the remaining portion of said dried granular calcium phosphate.

References Cited

UNITED STATES PATENTS

| | | | |
|---|---|---|---|
| 2,208,175 | 7/1940 | Wilson | 23—121 |
| 2,062,064 | 11/1936 | Knox et al. | 23—109 |
| 2,948,590 | 8/1960 | Smalter et al. | 23—109 |
| 2,271,361 | 1/1942 | Carpenter et al. | 23—109 |
| 2,067,538 | 1/1937 | MacIntyre | 23—109 |
| 2,021,671 | 1/1935 | Skinner | 23—109 |
| 1,924,137 | 8/1933 | Stokes et al. | 23—109 |
| 2,108,940 | 2/1938 | MacIntyre | 23—109 |
| 2,121,208 | 2/1938 | Milligan | 23—109 |

FOREIGN PATENTS 1,360,912  4/1964  France.

EDWARD STERN, Primary Examiner

U.S. Cl. X.R.

23—109